(12) United States Patent
Gottschalt et al.

(10) Patent No.: US 9,969,195 B2
(45) Date of Patent: May 15, 2018

(54) METHOD AND DEVICE FOR MEASURING THE CONTAMINATION OF LEDS AND INKJET PRINTING MACHINE AND OFFSET PRINTING PRESS HAVING THE DEVICE

(71) Applicant: HEIDELBERGER DRUCKSMASCHINEN AG, Heidelberg (DE)

(72) Inventors: Oliver Gottschalt, Mannheim (DE); Michael Kohlmann, Frankenthal (DE)

(73) Assignee: Heidelberger Druckmaschinen AG, Heidelberg (DE)

( * ) Notice: Subject to any disclaimer, the term of this patent is extended or adjusted under 35 U.S.C. 154(b) by 0 days. days.

(21) Appl. No.: 15/215,900

(22) Filed: Jul. 21, 2016

(65) Prior Publication Data
US 2017/0021652 A1    Jan. 26, 2017

(30) Foreign Application Priority Data

Jul. 22, 2015  (DE) .................. 10 2015 213 785

(51) Int. Cl.
| | |
|---|---|
| *B41J 29/38* | (2006.01) |
| *B41J 2/45* | (2006.01) |
| *B41F 7/02* | (2006.01) |
| *G01K 13/00* | (2006.01) |
| *B41F 33/00* | (2006.01) |
| *B41F 23/04* | (2006.01) |

(52) U.S. Cl.
CPC .............. *B41J 29/38* (2013.01); *B41F 7/02* (2013.01); *B41F 23/0453* (2013.01); *B41F 33/00* (2013.01); *G01K 13/00* (2013.01)

(58) Field of Classification Search
CPC ..... B41J 2/435; B41J 2/44; B41J 2/447; B41J 2/45; B41J 2/47; B41J 2/475; B41J 29/38; B41J 11/002; B41F 7/02; B41F 23/0453; B41F 33/00; G01K 13/00
See application file for complete search history.

(56) References Cited

U.S. PATENT DOCUMENTS

| | | |
|---|---|---|
| 8,220,391 B2 | 7/2012 | Hirokawa et al. |
| 8,517,750 B2 | 8/2013 | Martinez et al. |

(Continued)

FOREIGN PATENT DOCUMENTS

| | | | |
|---|---|---|---|
| DE | 102009007873 A1 | 8/2009 | |
| DE | 102012013894 A1 * | 1/2014 | ......... H05B 33/0842 |

(Continued)

OTHER PUBLICATIONS

Ambright GMBH, MachineTranslationofDE102012013894 A1, 2014.*
Mueller, MachineTranslationofJP2014-121876A, 2014.*
Ambright GMBH, MachineTranslationofDE102012013894 A1, 2104.*

*Primary Examiner* — Geoffrey Mruk
*Assistant Examiner* — Scott A Richmond
(74) *Attorney, Agent, or Firm* — Laurence A. Greenberg; Werner H. Stemer; Ralph E. Locher

(57) ABSTRACT

A method and a device are provided for measuring the contamination of a transparent covering of a plate having LED emitters which are cooled individually or in groups by cooling units. The temperatures of the individual or grouped cooling units are measured and conclusions about contamination are drawn from a comparison of the temperatures with one another. An inkjet printing machine and an offset printing press having the device are also provided.

7 Claims, 1 Drawing Sheet

(56) References Cited

U.S. PATENT DOCUMENTS

2006/0209111 A1* 9/2006 Usui .................... B41J 2/165
                                                        347/14
2012/0062667 A1* 3/2012 Roof ................... B41J 11/0015
                                                        347/102

FOREIGN PATENT DOCUMENTS

| DE | 102013019814 A1 | | 6/2014 | |
|----|-----------------|---|--------|---|
| JP | 2014121876 A | * | 7/2014 | ......... B41F 23/0453 |
| WO | 2011031529 A2 | | 3/2011 | |

* cited by examiner

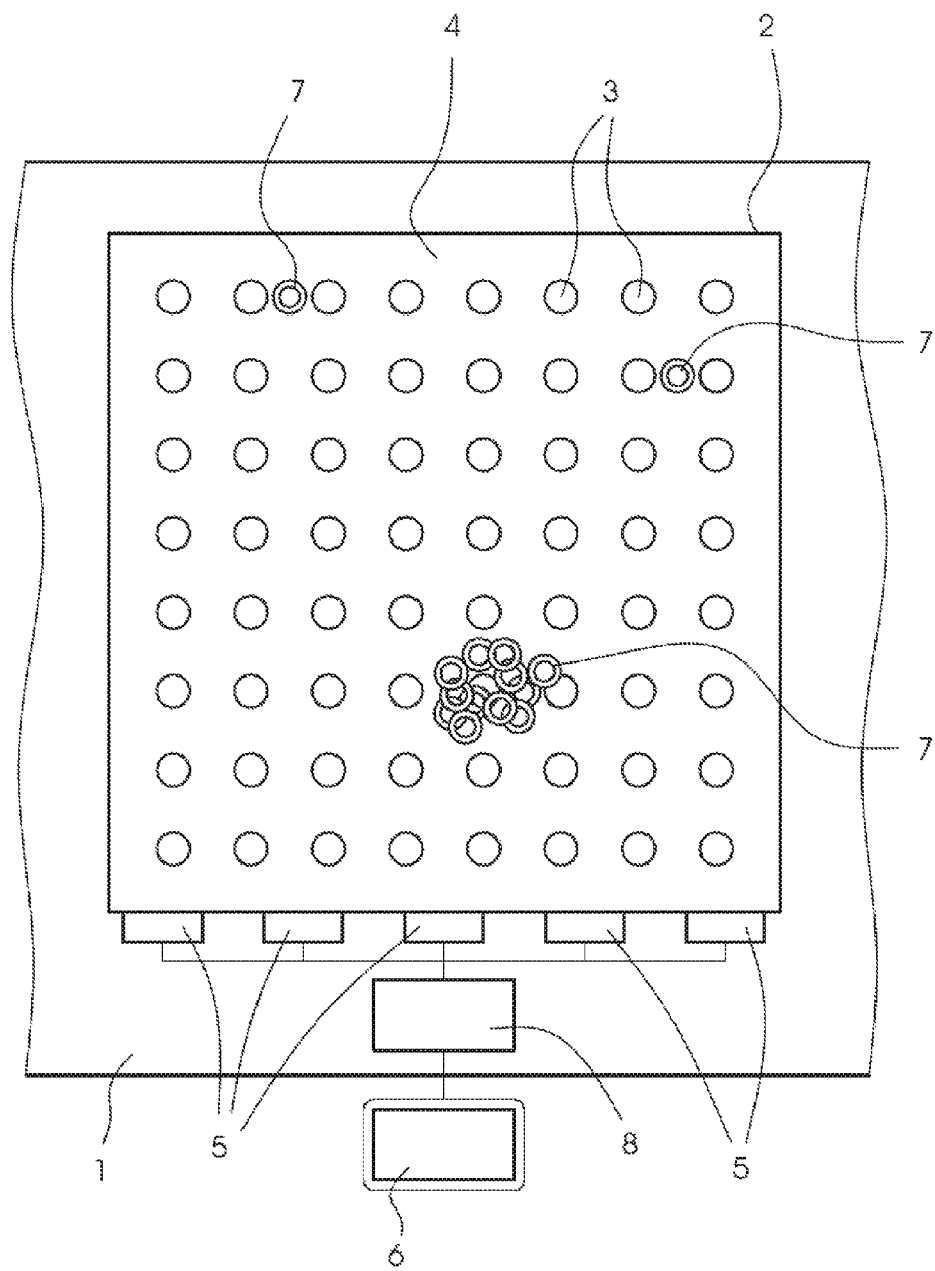

METHOD AND DEVICE FOR MEASURING THE CONTAMINATION OF LEDS AND INKJET PRINTING MACHINE AND OFFSET PRINTING PRESS HAVING THE DEVICE

CROSS-REFERENCE TO RELATED APPLICATION

This application claims the priority, under 35 U.S.C. § 119, of German Patent Application DE 10 2015 213 785.6, filed Jul. 22, 2015; the prior application is herewith incorporated by reference in its entirety.

BACKGROUND OF THE INVENTION

Field of the Invention

The invention relates to a method and a device for measuring the contamination of LEDs. The invention also relates to an inkjet printing machine and an offset printing press having the device.

LED UV dryers are used in the curing of UV ink or UV varnish, in particular when printing sheets and three-dimensional components of any desired materials with inkjet or offset printing machines.

German Patent Application DE 10 2009 007 873 A1, corresponding to U.S. Pat. No. 8,220,391, describes such an LED dryer for curing ink for printing machines that can be dried by UV light. In that case, LEDs are disposed in rows on a carrier, transversely with respect to the transport direction of a printing material.

International Publication WO 2011/031529 A2, corresponding to U.S. Pat. Nos. 8,517,750 and 8,558,200, reveals a device for protecting the LEDs against contamination. In that case, the LEDs are accommodated in a housing, which is provided with a transparent covering in the outlet area of the UV radiation.

German Patent Application DE 10 2013 019 814 A1 discloses a device which can determine the level of contamination of a transparent covering of such an LED module. In that case, a temperature measurement is carried out with additional sensors at one or more locations of the covering. It is then possible to derive the level of contamination of the covering from the values determined. If the contamination is too high, the LED UV dryer is switched off.

The problem posed by such emitters in practice resides in the fact that contaminants of the transparent coverings reflect the UV light. This leads to temperature differences within the window and thus to stresses. If the temperature differences are too high, the covering breaks. The more contaminated a window is, the more radiation is reflected back.

SUMMARY OF THE INVENTION

It is accordingly an object of the invention to provide a method and a device for measuring the contamination of LEDs and an inkjet printing machine and an offset printing press having the device, which overcome the hereinaforementioned disadvantages of the heretofore-known methods and devices of this general type and which determine the level of contamination of a transparent covering without using additional sensors to measure the temperature of the covering itself.

With the foregoing and other objects in view there is provided, in accordance with the invention, a device for measuring a level of contamination of a transparent covering of a plate having LED emitters being cooled individually or in groups by cooling units. The device comprises electronics directly or indirectly measuring temperatures of the LED emitters. The electronics compare the measured temperatures with one another and drawing conclusions about the contamination of the transparent covering from the comparison of the temperatures.

The device according to the invention for measuring the level of contamination of a transparent covering of a plate having LED emitters provides for the emitters to be cooled individually or in groups. The temperatures of the individual or grouped cooling units or the temperatures of the LED emitters are in this case measured directly or indirectly and determinations, inferences, suggestions or conclusions about contamination are drawn from the comparison of the temperatures with one another. Indirect measurement is achieved, for example, through temperature sensors on the cooling units. Direct measurement is achieved, for example, through temperature sensors on the LED emitters.

A first advantageous development of the invention provides for the LED emitters to be switchable on and off independently of one another.

A further embodiment of the device provides for an average value to be calculated from the temperatures of all of the cooling units or LED emitters. By using this average value, a threshold temperature value which must not be exceeded by any of the cooling units or LED emitters is then determined. This threshold value is chosen in such a way that it lies below the critical temperature difference between the average temperature of the LED emitters and of an individual LED emitter which would cause the transparent covering to break.

Furthermore, in the sense of the invention, those LED emitters associated with a cooling unit which has reached this threshold temperature are switched off automatically, in order to ensure that the threshold temperature is not exceeded.

An additional advantageous development of the invention provides for the plate having LED emitters to be assigned an optical output device. In addition, a threshold temperature value for the average temperature of the LED emitters is defined. This threshold temperature value corresponds to a critical level of contamination of the whole of the transparent covering. If the threshold value is reached, the fact that the transparent covering must be cleaned or replaced is indicated on the optical output device.

With the objects of the invention in view, there is also provided an inkjet printing machine or an offset printing press, comprising an LED UV drying unit and a device according to the invention for monitoring the contamination in the LED UV drying unit.

With the objects of the invention in view, there is additionally provided a method for measuring a level of contamination of a transparent covering of a plate having LED emitters being cooled individually or in groups by cooling units. The method comprises using electronics to directly or indirectly measure temperatures of the LED emitters, using the electronics to compare the measured temperatures with one another, and using the electronics to draw conclusions about the contamination of the transparent covering from the comparison of the temperatures.

With the objects of the invention in view, there is concomitantly provided a printing machine, comprising a plate having LED emitters, a transparent covering which covers the plate, cooling units cooling the LED emitters individually or in groups, and a device for measuring a level of contamination of the transparent covering. The device includes electronics directly or indirectly measuring temperatures of the LED emitters. The electronics compare the measured temperatures with one another and draw conclusions about the contamination of the transparent covering from the comparison of the temperatures.

Other features which are considered as characteristic for the invention are set forth in the appended claims.

Although the invention is illustrated and described herein as embodied in a method and a device for measuring the contamination of LEDs and an inkjet printing machine and an offset printing press having the device, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE SINGLE VIEW OF THE DRAWING

The FIGURE of the drawing is a fragmentary, diagrammatic, bottom-plan view of a printing machine, showing the underside of a plate having LED emitters and a transparent covering which has contaminants.

DETAILED DESCRIPTION OF THE INVENTION

Referring now in detail to the single FIGURE of the drawing, there is seen a plate 2 in an inkjet or offset printing machine 1 including an LED UV drying unit which has multiple LED emitters 3, each of which is assigned a cooling unit 5. A transparent covering 4 is located in an outlet area of UV radiation. The temperature of the cooling units 5 is measured continuously. This is done by electronics 8 which are connected to the control system of the printing machine 1 and an optical output device 6. An average value is determined from the measured results. By using this average value, a continuous determination is made of a threshold value which is lower than the temperature difference between an average temperature and the temperature which an individual cooling unit must have achieved in order to cause the transparent covering to break. In addition, a threshold value for the average temperature is defined. If that threshold value is reached, this means that the transparent covering 4 is highly contaminated and must be cleaned or changed. Initially, the transparent covering 4 is clean. The temperature of all of the cooling units 5 is equally high. In the course of the printing process, contaminants 7 are deposited on the transparent covering. These reflect the UV radiation output by the LED emitters 3. As a result, individual emitters 3 are heated. This likewise leads to a temperature rise of the cooling units 5 assigned to the emitters 3. The average temperature of the cooling units 5 rises. As is seen, a particularly large quantity of contaminants 7 has collected under an emitter 3. A particularly large quantity of radiation is therefore reflected onto the latter. The temperature of its cooling unit 5 in this case reaches the threshold value which represents the maximum permissible difference with respect to the average temperature. The emitter 3 is then switched off automatically. The optical output device 6 indicates to the operator when the permissible threshold value of the temperature is exceeded.

The invention claimed is:

1. A printing machine, comprising:
   a plate having LED emitters;
   a transparent covering covering said plate;
   cooling units cooling said LED emitters individually or in groups; and
   a device for measuring a level of contamination of said transparent covering, said device including electronics indirectly measuring temperatures of said LED emitters by measuring temperatures of said corresponding cooling units associated with said LED emitters, said electronics programmed for comparing the measured temperatures with one another and drawing conclusions about the contamination of said transparent covering from the comparison of the temperatures.

2. A device for measuring a level of contamination of a transparent covering of a plate having LED emitters being cooled individually or in groups by cooling units, the device comprising:
   electronics indirectly measuring temperatures of the LED emitters by measuring temperatures of the corresponding cooling units associated with said LED emitters;
   said electronics being programmed for comparing the measured temperatures with one another and drawing conclusions about the contamination of the transparent covering from the comparison of the temperatures;
   said electronics calculating an average value from the temperatures of all of the cooling units and using the average value to determine a threshold temperature value which must not be exceeded by any of the cooling units; and
   an optical output device associated with the plate having the LED emitters, said optical output device indicating a warning about the contamination of the transparent covering as soon as the average temperature of the LED emitters reaches a defined threshold value.

3. The device according to claim 2, wherein said electronics measure the temperatures of the cooling units associated with the LED emitters.

4. The device according to claim 2, wherein the LED emitters are connected to be switched on and off independently of one another.

5. The device according to claim 2, wherein the device automatically switches off at least one of the LED emitters as soon as the temperature of the cooling unit associated with the at least LED emitter reaches a defined threshold temperature value.

6. An inkjet printing machine, comprising:
   an LED UV drying unit; and
   a device according to claim 2 for monitoring the contamination in the LED UV drying unit.

7. An offset printing press, comprising:
   an LED UV drying unit; and
   a device according to claim 2 for monitoring the contamination in the LED UV drying unit.

* * * * *